(12) United States Patent
Feldman et al.

(10) Patent No.: US 7,331,226 B2
(45) Date of Patent: Feb. 19, 2008

(54) FORCE MEASUREMENT SYSTEM FOR AN ISOMETRIC EXERCISE DEVICE

(75) Inventors: Philip Feldman, Catonsville, MD (US); Peter Tsai, Olney, MD (US); Greg Merril, Bethesda, MD (US); Jason Grimm, Owings Mills, MD (US); Jeff Schott, Bethesda, MD (US)

(73) Assignee: Powergrid Fitness, Inc., Laurel, MD (US)

( * ) Notice: Subject to any disclaimer, the term of this patent is extended or adjusted under 35 U.S.C. 154(b) by 14 days.

(21) Appl. No.: 11/133,449

(22) Filed: May 20, 2005

(65) Prior Publication Data

US 2006/0260395 A1    Nov. 23, 2006

(51) Int. Cl.
*G01L 7/00* (2006.01)
(52) U.S. Cl. ................. 73/379.01; 73/862.043
(58) Field of Classification Search .......... 200/6; 345/161; 361/290; 73/862.043, 379.01; 434/465; 482/109
See application file for complete search history.

(56) References Cited

U.S. PATENT DOCUMENTS

| | | |
|---|---|---|
| D188,376 S | 7/1960 | Hotkins et al. |
| 3,428,312 A | 2/1969 | Machen |
| 4,296,931 A | 10/1981 | Yokoi |
| 4,337,050 A | 6/1982 | Engalitcheff, Jr. |
| 4,494,754 A | 1/1985 | Wagner, Jr. |
| 4,630,817 A | 12/1986 | Buckley |
| 4,680,577 A | 7/1987 | Straayer et al. |
| 4,691,694 A | 9/1987 | Boyd et al. |

(Continued)

FOREIGN PATENT DOCUMENTS

JP            11309270          9/1999

(Continued)

OTHER PUBLICATIONS

Tom Dang et al.; "Interactive Video Exercise System for Pediatric Brain Injury Rehabilitation"; Proceedings of the RESNA 20th Annual Conference, Jun. 1998; 3 pages.

(Continued)

*Primary Examiner*—Jewel Thompson
(74) *Attorney, Agent, or Firm*—Edell, Shapiro & Finnan, LLC

(57) ABSTRACT

A force measurement system includes an effector device with a hollow interior, an inner support secured within the hollow interior of the effector device, and at least one sensor secured at a selected location to the inner support and configured to measure a force applied to the inner support. At least one outer surface portion of the inner support is coupled with at least one interior surface portion of the effector device such that forces applied to the effector device are at least partially transferred to the inner support for measurement by the sensor.

24 Claims, 6 Drawing Sheets

U.S. PATENT DOCUMENTS

| | | | |
|---|---|---|---|
| 4,711,447 A | 12/1987 | Mansfield | |
| 4,742,832 A | 5/1988 | Kauffmann et al. | |
| 4,855,704 A | 8/1989 | Betz | |
| D318,073 S | 7/1991 | Jang | |
| 5,054,771 A | 10/1991 | Mansfield | |
| 5,089,960 A | 2/1992 | Sweeney, Jr. | |
| 5,104,119 A | 4/1992 | Lynch | |
| 5,116,296 A | 5/1992 | Watkins et al. | |
| 5,151,071 A | 9/1992 | Jain et al. | |
| 5,199,875 A | 4/1993 | Trumbull | |
| 5,299,810 A | 4/1994 | Pierce et al. | |
| 5,360,383 A | 11/1994 | Boren | |
| 5,362,298 A | 11/1994 | Brown et al. | |
| 5,368,546 A | 11/1994 | Stark et al. | |
| 5,431,569 A | 7/1995 | Simpkins et al. | |
| 5,462,503 A | 10/1995 | Benjamin et al. | |
| 5,466,200 A | 11/1995 | Ulrich et al. | |
| 5,547,439 A | 8/1996 | Rawls et al. | |
| 5,551,693 A | 9/1996 | Goto et al. | |
| D376,826 S | 12/1996 | Ashida | |
| 5,584,700 A | 12/1996 | Feldman et al. | |
| 5,591,104 A | 1/1997 | Andrus et al. | |
| D384,115 S | 9/1997 | Wilkinson et al. | |
| 5,669,773 A | 9/1997 | Gluck | |
| 5,689,285 A | 11/1997 | Asher | |
| 5,690,582 A | 11/1997 | Ulrich et al. | |
| 5,713,794 A | 2/1998 | Shimojima et al. | |
| 5,716,274 A | 2/1998 | Goto et al. | |
| 5,721,566 A | 2/1998 | Rosenberg et al. | |
| 5,785,630 A | 7/1998 | Bobick et al. | |
| D397,164 S | 8/1998 | Goto | |
| 5,792,031 A | 8/1998 | Alton | |
| 5,813,958 A | 9/1998 | Tomita | |
| D402,317 S | 12/1998 | Goto | |
| 5,853,326 A | 12/1998 | Goto et al. | |
| 5,889,507 A | 3/1999 | Engle et al. | |
| D407,758 S | 4/1999 | Isetani et al. | |
| 5,890,995 A | 4/1999 | Bobick et al. | |
| 5,897,469 A * | 4/1999 | Yalch | 482/109 |
| 5,901,612 A | 5/1999 | Letovsky | |
| 5,904,639 A | 5/1999 | Smyser et al. | |
| D411,258 S | 6/1999 | Isetani et al. | |
| 5,921,899 A | 7/1999 | Rose | |
| 5,929,782 A | 7/1999 | Stark et al. | |
| 5,947,824 A | 9/1999 | Minami et al. | |
| 5,980,256 A | 11/1999 | Carmein | |
| 5,989,157 A | 11/1999 | Walton | |
| D421,070 S | 2/2000 | Jang et al. | |
| 6,044,772 A | 4/2000 | Gaudette et al. | |
| 6,086,518 A | 7/2000 | MacCready, Jr. | |
| 6,102,832 A | 8/2000 | Tani | |
| D431,051 S | 9/2000 | Goto | |
| 6,147,674 A | 11/2000 | Rosenberg et al. | |
| D434,769 S | 12/2000 | Goto | |
| D434,770 S | 12/2000 | Goto | |
| 6,203,432 B1 | 3/2001 | Roberts et al. | |
| 6,216,547 B1 | 4/2001 | Lehtovaara | |
| D441,369 S | 5/2001 | Goto | |
| 6,228,000 B1 | 5/2001 | Jones | |
| 6,231,444 B1 | 5/2001 | Goto et al. | |
| D444,469 S | 7/2001 | Goto | |
| 6,296,595 B1 | 10/2001 | Stark et al. | |
| 6,325,767 B1 | 12/2001 | Wolff et al. | |
| 6,353,427 B1 | 3/2002 | Rosenberg | |
| 6,359,613 B1 | 3/2002 | Poole | |
| D456,410 S | 4/2002 | Ashida | |
| D456,854 S | 5/2002 | Ashida | |
| D457,570 S | 5/2002 | Brinson | |
| 6,388,655 B1 | 5/2002 | Leung | |
| 6,394,905 B1 | 5/2002 | Takeda et al. | |
| D459,727 S | 7/2002 | Ashida | |
| D460,506 S | 7/2002 | Tamminga et al. | |
| D462,683 S | 9/2002 | Ashida | |
| 6,482,010 B1 * | 11/2002 | Marcus et al. | 434/45 |
| 6,514,145 B1 | 2/2003 | Kawabata et al. | |
| D471,594 S | 3/2003 | Nojo | |
| 6,568,334 B1 | 5/2003 | Gaudette et al. | |
| 6,616,579 B1 | 9/2003 | Reinbold et al. | |
| 6,636,161 B2 | 10/2003 | Rosenberg | |
| 6,663,058 B1 | 12/2003 | Peterson et al. | |
| 6,676,569 B1 | 1/2004 | Radow | |
| 6,726,566 B2 | 4/2004 | Komata | |
| D500,100 S | 12/2004 | van der Meer | |
| 6,859,198 B2 * | 2/2005 | Onodera et al. | 345/161 |
| 6,888,076 B2 * | 5/2005 | Hetherington | 200/6 A |
| D510,391 S | 10/2005 | Merril et al. | |
| 6,975,302 B1 | 12/2005 | Ausbeck, Jr. | |
| 6,991,483 B1 | 1/2006 | Milan et al. | |
| D514,627 S | 2/2006 | Merril et al. | |
| 7,004,787 B2 | 2/2006 | Milan | |
| D517,124 S | 3/2006 | Merril et al. | |
| 7,011,605 B2 | 3/2006 | Shields | |
| 7,033,176 B2 | 4/2006 | Feldman et al. | |
| 7,083,546 B2 | 8/2006 | Zillig et al. | |
| 7,121,982 B2 | 10/2006 | Feldman | |
| 2001/0018363 A1 | 8/2001 | Goto et al. | |
| 2002/0080115 A1 * | 6/2002 | Onodera et al. | 345/161 |
| 2002/0185041 A1 | 12/2002 | Herbst | |
| 2003/0069108 A1 | 4/2003 | Kaiserman et al. | |
| 2003/0193416 A1 | 10/2003 | Ogata et al. | |
| 2004/0038786 A1 | 2/2004 | Kuo et al. | |
| 2004/0041787 A1 | 3/2004 | Graves | |
| 2004/0077464 A1 | 4/2004 | Feldman et al. | |
| 2004/0099513 A1 * | 5/2004 | Hetherington | 200/6 A |
| 2004/0110602 A1 | 6/2004 | Feldman | |
| 2004/0180719 A1 | 9/2004 | Feldman et al. | |
| 2004/0259688 A1 | 12/2004 | Stabile | |
| 2005/0070154 A1 | 3/2005 | Milan | |
| 2005/0130742 A1 | 6/2005 | Feldman et al. | |
| 2006/0097453 A1 | 5/2006 | Feldman et al. | |
| 2006/0205565 A1 | 9/2006 | Feldman et al. | |
| 2006/0211543 A1 | 9/2006 | Feldman et al. | |
| 2006/0217243 A1 | 9/2006 | Feldman et al. | |
| 2006/0223634 A1 | 10/2006 | Feldman et al. | |
| 2007/0155589 A1 | 7/2007 | Feldman et al. | |
| 2007/0219050 A1 | 9/2007 | Merril | |

FOREIGN PATENT DOCUMENTS

| | | |
|---|---|---|
| WO | WO91/11221 | 8/1991 |
| WO | WO 00/57387 A1 | 9/2000 |

OTHER PUBLICATIONS

"Innovation in Action"; Biofeedback Motor Control GmbH; 2 pages.

Glas, V; "Chair Puts Player on the Joystick"; Machine Design; Penton, Inc., vol. 63, No. 21, Oct. 24, 1991; p. 73.

"AGH's Atari Project Puffer Page"; http://www.atarihq.com/othersec/puffer/index.html; retrieved from the internet on Sep. 19, 2002; 4 pages.

"The Legible City"; www.jeffrey-shaw.net; retrieved from the Internet on Sep. 19, 2002; 3 pages.

Antonoff, M.; "Living in a Virtual World"; Popular Science, Jun. 1993; 2 pages.

Antonoff, M.; "Virtual Violence: Boxing without Bruises"; Popular Science, Apr. 1993; 1 page.

Brown, S.; "Video Cycle Race"; Popular Science, May 1989; 1 page.

"Military: Arcade Aces"; Popular Mechanics, Mar. 1982; 1 page.

"Suncom Aerobics Joystick"; www.atarihq.com; retrieved from Internet Sep. 19, 2002; 1 page.

Aukstakalnis, et al.; "The Art and Science of Virtual Reality: Silicon Mirage"; pp. 197-205.

Hamit, F.; "Virtual Reality and the Exploration of Cyberspace"; Jun. 1, 1993, 4 pages.

"The Race Begins with $85"; Randal Sports; 1990; 1 page.

"The New Exertainment System"; Life Fitness; 1995; 1 page.

"The History of Nintendo (1889-1997)"; Retrieved from Internet Aug. 24, 1998; pp. 1 and 9-10.

Skorupa, J.; "Virtual Fitness", Sports Science, Popular Mechanics; Oct. 1994; 3 pages.

Manning, R.; "Videogame Players Get a Workout with the Exertainment"; The Courier-Journal Sep. 25, 1994: 1 page.

Shah, "Mad Catz Universal MC2 Racing Wheel", Feb. 18, 2005.

"Universal S-Video/Audio Cable", retrieved from the Internet, www.madcatz.com.

* cited by examiner

FORCE MEASUREMENT SYSTEM FOR AN ISOMETRIC EXERCISE DEVICE

BACKGROUND OF THE INVENTION

1. Technical Field

The present invention pertains to isometric exercise devices. In particular, the present invention pertains to a system that measures forces applied on isometric exercise devices that serves as a computer system peripheral to facilitate user interaction with a host computer system while the user performs isometric exercises.

2. Discussion of the Related Art

Currently, a wide variety of different types of exercise devices are commonly utilized to promote health and fitness, particularly for people having sedimentary lifestyles and/or work environments, and to provide rehabilitation for particular types of injuries. The vast majority of these exercise devices utilize isokinetic and/or isotonic forms of exercise during operation, where a user's muscles are moved under resistance through a selected range of motion.

Isometric exercise is another effective form of muscular exercise that is very useful for rehabilitation, fitness and training. Isometric exercise involves the exertion of force by a user against an object that significantly resists movement as a result of the exerted force such that there is minimal or substantially no movement of the user's muscles during the force exertion. Examples of simple forms of isometric exercise include pushing against a stationary surface (e.g., a doorframe or a wall), attempting to pull apart tightly gripped hands or to bend or flex a sufficiently rigid steel bar, etc.

Due to their inherently tedious nature, isometric exercise devices are less popular and, accordingly, are limited in type and availability, in comparison to more conventional forms of isotonic and isokinetic exercise devices. However, the tedious nature of performing isometric exercises can be diminished by incorporating isometric exercise devices with interactive entertainment such as video gaming systems. In particular, isometric exercise devices can be configured to serve as peripherals (e.g., joysticks) for controlling certain gaming features of a video gaming system based upon isometric exercises performed by the user upon the exercise devices.

Examples of isometric exercise devices that are configured for use with host computer systems as peripherals or video game controllers for video gaming applications are described in U.S. patent application Ser. No. 10/309,565, entitled "Computer Interactive Isometric Exercise System and Method for Operatively Interconnecting the Exercise System to a Computer System for Use as a Peripheral" and filed Dec. 4, 2002, and U.S. patent application Ser. No. 10/975,185, entitled "Configurable Game Controller and Method of Selectively Assigning Game Functions to Controller Input Devices" and filed Oct. 28, 2004, the disclosures of which are incorporated herein by reference in their entireties.

A particularly important feature in many isometric exercise devices, particularly isometric exercise devices that are utilized as video game controllers as described above, is the ability to measure forces applied to an exercise object or effector device by one or more muscle groups. One or more strain gauges can be mounted to the effector device to measure applied forces. The strain gauges are typically mounted on the exterior of the effector device. However, this leaves the strain gauges on the device exposed to the surrounding environment, along with associated wiring that connects the strain gauges to processors and/or other circuit components. To prevent damage to the strain gauges, protective covers or shields are secured to the device to cover the strain gauges and wiring, which can result in difficult assembly of the effector device and can further render the device cumbersome and somewhat difficult to manipulate by the user in a particular exercise scenario.

If the effector device is hollow (e.g., an elongated hollow bar), the strain gauges may be placed on interior surface portions of the device to prevent their exposure during use of the device. However, depending upon the dimensions of the effector device, mounting of strain gauges within its hollow interior can be difficult. In addition, attaching wiring to the internally mounted strain gauges is also difficult and often requires special tooling and time intensive procedures during assembly of the device.

OBJECTS AND SUMMARY OF THE INVENTION

Accordingly, it is an object of the present invention to employ an isometric exercise device, including internally mounted strain gauge sensors that, is easy to manufacture, easy to manipulate and does not require shielding of sensors and associated wiring secured to the external surfaces of the device.

It is another object of the present invention to configure such an isometric device as a game controller for use with a gaming system so as to facilitate video gaming control scenarios by a user while engaging in isometric exercise activity with the device.

The aforesaid objects are achieved individually and/or in combination, and it is not intended that the present invention be construed as requiring two or more of the objects to be combined unless expressly required by the claims attached hereto.

According to the present invention, a force measurement system comprises an effector device including a hollow interior, an inner support secured within the hollow interior of the effector device, and at least one sensor secured at a selected location to the inner support and configured to measure a force applied to the inner support. At least one outer surface portion of the inner support is coupled with at least one interior surface portion of the effector device such that forces applied to the effector device are at least partially transferred to the inner support for measurement by the at least one sensor.

The force measurement system can further include a processor including a data processing module to receive and process data corresponding to applied force information measured by the at least one sensor for transference to a host computer. The data processing module produces information in a format resembling data output from a host computer peripheral to facilitate user interaction with the host computer in response to forces applied to the effector device by a user.

The present invention provides several advantages. In particular, the present invention secures the strain gauge sensors and associated wiring within an interior portion of the effector device so as to effectively minimize or eliminate exposure and/or potential damage to the sensors and/or wiring during applications of force to the effector device. In addition, since the outer surfaces of the isometric exercise device no longer support the sensors and wiring, the device is less cumbersome and more easily adaptable for different uses. Further, assembly of the device is simplified because the strain gauges and wiring can be secured to the inner support or interior gauge mounting structure prior to securing the gauge mounting structure within the effector device.

The above and still further objects, features and advantages of the present invention will become apparent upon consideration of the following detailed description of specific embodiments thereof, particularly when taken in conjunction with the accompanying drawings wherein like reference numerals in the various figures are utilized to designate like components.

DETAILED DESCRIPTION OF THE PREFERRED EMBODIMENTS

Figure 1:
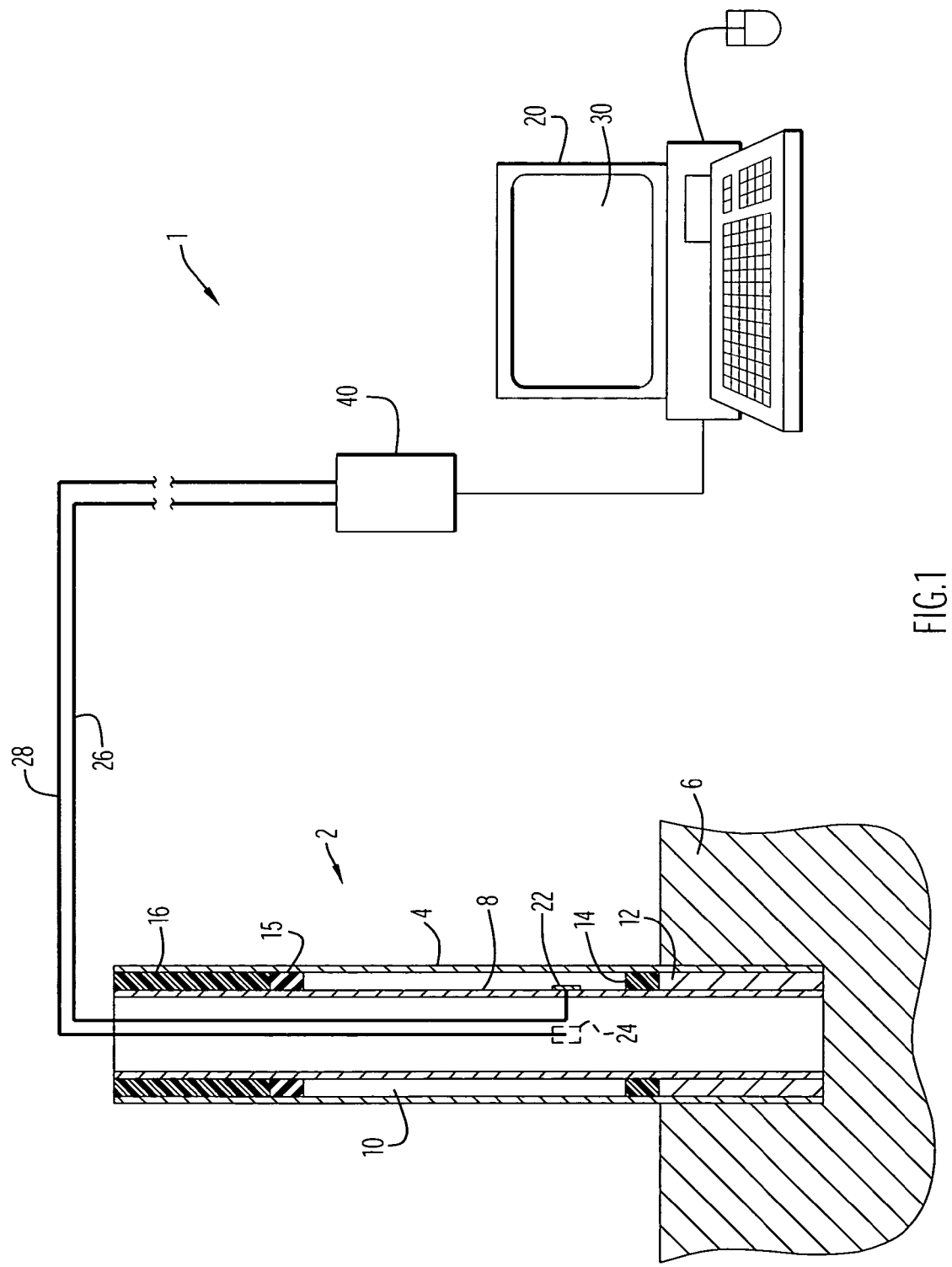
FIG. 1 is a view in perspective of an interactive isometric exercise system according to the present invention, including a partial view in cross-section of an effector device serving as a peripheral for the system.

An exemplary embodiment of an interactive isometric exercise system in accordance with the present invention is depicted in FIG. 1. In particular, system 1 includes an effector device 2 including an effector 4 (preferably in the form of an elongated rod or bar) that measures one or more amounts of force applied to the effector, and control circuitry 40 that communicates with the effector as well as a host computer system 20. The effector is secured at a first end to a support structure 6 (e.g., a base, platform or other suitable securing structure), while the second end of the effector is a free end that extends a selected distance from support structure 6. The control circuitry includes a processor that receives force measurement information from one or more strain gauge sensors disposed within effector device 2 and translates such information into data recognizable by the host computer system in a manner described below. The processor may be implemented by any conventional or other microprocessor or circuitry. The host computer system is typically implemented by a conventional personal or other computer system (e.g., laptop, IBM compatible, Macintosh PC, PDA, etc.) including a base (e.g., including the processors, memories, software, etc.), keyboard, monitor and optional mouse or other input device. Alternatively, the host computer system can be a video gaming system (e.g., PS2 available from Sony, XBOX available from Microsoft, GAMECUBE available from Nintendo, etc.). The host computer system executes a software application and facilitates user interaction with the application via the exercise system.

Effector 4 includes an elongated and generally cylindrical bar or rod constructed of any suitably rigid material (e.g., stainless steel or any other suitable metal alloy) that is capable of being slightly deformed within its elastic limit in response to any combination of bending, twisting, tension and compression forces applied, for example, by the hands of a user to the effector bar. The effector bar may include any suitable exterior gripping surface (e.g., smooth, multifaceted, etc.). The amount and types of deformations applied to effector 4, which is proportional to the amount and types of straining forces applied by the user, is measurable by one or more sensors disposed at suitable locations within the effector as described below.

Exemplary sensors that are capable of measuring minute degrees of deflection of the effector along any number of different axes are strain gauge sensors. Strain gauges are well known for measuring strain applied to an object and can be realized, e.g., in the form of metallic wire or foil or silicon-based semiconductor devices. When a strain gauge is applied in a suitable orientation to an exterior surface of an object, the strain gauge electrical resistance varies in proportion to the amount of a particular strain applied to the object. In an exemplary embodiment, the change in resistance of the strain gauge is measurable utilizing a conventional Wheatstone bridge configuration, where the strain gauge forms one of the resistors in the bridge. The Wheatstone bridge may be configured in any conventional manner to determine the change in resistance of the strain gauge. For example, when the object to which the strain gauge is applied undergoes a strain deformation, the change in resistance of the strain gauge can be easily determined by comparing a measured voltage across the bridge with a reference voltage and processing the voltage difference in a manner described below.

In the effector bar configuration of the present invention, strain gauge sensors are secured to a gauge mounting structure disposed within the effector. Referring to FIG. 1, a gauge mounting structure 8 is secured within the hollow interior and extends substantially the length of effector bar 4. The effector preferably includes at least one open end to facilitate insertion of the gauge mounting structure within the effector during assembly of the effector device as described below. The mounting structure is preferably an elongated hollow tube and has transverse cross-sectional dimension (e.g., the outer diameter of the internal mounting structure) that is smaller than the transverse cross-sectional dimension of the effector (e.g., the internal diameter of the effector). Thus, an annular gap 10 exists between effector 4 and gauge mounting structure 8 nested within the effector.

The gauge mounting structure is preferably constructed of a suitable material that, like the effector, is capable of being slightly deformed within its elastic limit in response to any combination of bending, twisting, tension and compression forces applied to the effector and translated to the gauge mounting structure as described below. More preferably, the gauge mounting structure is constructed of a material that is more compliant and provides greater flexibility for the mounting structure in comparison to the effector. Specifically, when the same force is applied at substantially similar locations and directions to each of effector 4 and gauge mounting structure 8, the gauge mounting structure is more flexible and is capable of deforming to a slightly larger extent or degree (i.e., has a greater deformation) than the effector without exceeding the elastic limit of the gauge mounting structure. In an exemplary embodiment in which the effector is constructed of steel or other suitable metal alloy, the gauge mounting structure is preferably constructed of polyvinyl chloride (PVC) or any other suitable plastic or polymer material that is more compliant or flexible than the metal materials used to construct the effector.

The gauge mounting structure is stabilized within and indirectly secured along internal peripheral surface portions of the effector via suitable strain transfer materials preferably disposed proximate the longitudinal ends of the gauge mounting structure. The strain transfer materials facilitate transfer of forces or strains that are applied to the effector to the gauge mounting structure as described below. Referring to FIG. 1, a fitting 12 (e.g., a PVC coupling) is secured at a first end of gauge mounting structure 8 that corresponds with the first end of effector 4 (i.e., the effector end that is secured within support structure 6). Alternatively, fitting 12 may be secured at the second end of the gauge mounting structure that corresponds with the second, free end of the effector.

The fitting forms a sheath around the longitudinal outer periphery of the gauge mounting structure, and the fitting further has a transverse cross-sectional dimension that is slightly smaller than the transverse cross-sectional dimension (e.g., inner diameter) of the effector. In addition, the outer surface portions of the fitting frictionally engage the inner surface portions of the effector to provide a first indirect contact area or contact bridge between the effector and the gauge mounting structure at their corresponding first ends, and this contact bridge serves as one strain transfer location in which forces or strains applied to the effector are transferred to the gauge mounting structure. A first plug 14 of hardened epoxy resin is also secured within annular gap 10 at a location adjacent fitting 12, where the first resin plug is secured to inner and outer peripheral surface portions of the effector and gauge mounting structure and also to the adjacent end surface of the fitting to provide additional surface contact areas between the effector and the gauge mounting structure for facilitating strain transfer from the effector to the gauge mounting structure.

A second plug 16 of hardened epoxy resin is disposed within annular gap 10 at the corresponding second ends of effector 4 and gauge mounting structure 8. The second plug is secured to respective inner and outer peripheral surface portions of the effector and the gauge mounting structure to provide a second indirect contact area or contact bridge between the effector and the gauge mounting structure, thus providing another location at which forces or strains applied to the effector are transferred to the gauge mounting structure. The second plug 16 substantially fills the annular gap from a selected location along the gauge mounting structure to its second end. A foam collar 15 is disposed in the annular gap and surrounds an outer peripheral surface portion of the gauge mounting structure at the selected location adjacent the second plug. The foam collar is provided to facilitate formation of the second plug of hardened epoxy resin during assembly of effector device 2 as described below.

While the strain transfer materials described above include a fitting and hardened epoxy resin, it is noted that any suitable connecting or bridging material may be provided within the annular gap formed between the effector and the gauge mounting structure that facilitates transfer of applied forces from the effector to the gauge mounting structure. For example, fittings and/or plugs of hardened epoxy resin can be secured at both opposing (i.e., first and second) ends of and/or any other locations along the gauge mounting structure, where the fittings and/or plugs are suitably dimensioned to provide a contact or connecting bridge between corresponding inner and outer peripheral surface portions of the effector and the gauge mounting structure. The strain transfer materials are preferably suitably rigid so as to effect substantially complete transfer of forces between the effector and the gauge mounting structure with minimal or no absorbance of such forces by the strain transfer materials. While the preferred placement of strain transfer materials is at or near the opposing longitudinal ends of the effector and gauge mounting structure, the strain transfer materials may be disposed at any one or more suitable locations along the length of the effector device depending upon a particular application.

Two strain gauge sensors 22 and 24 are affixed at suitable locations on outer surface portions of gauge mounting structure 8 between the locations of the strain transfer materials. Preferably, the strain sensors are disposed at suitable locations along the gauge mounting structure where, depending upon a particular design and/or application, deformation of the effector and/or the gauge mounting structure will likely be the greatest or most significant. In the embodiment of FIG. 1, strain gauges are secured on gauge mounting structure 8 at a location that is closer to the first (i.e., fixed) end of the gauge mounting structure in comparison to the second (i.e., free) end of the gauge mounting structure.

The sensors are further aligned in a longitudinal direction of both the effector and the gauge mounting structure and are angularly offset from each other by approximately 90° on the outer periphery of the gauge mounting structure. In particular, the sensors are aligned to measure bending deflections of gauge mounting structure 8, which correspond with bending deflections of effector 4 that have been translated to the gauge mounting structure via the strain transfer materials, along at least two separate axes. For example, the two separate axes may be a predefined X axis and a predefined Y axis, where both axes are oriented in the same plane with respect to each other and perpendicular to the central axis of the effector, and each axis is further angularly offset 90° from the other axis. However, it is noted that any suitable number of sensors (e.g., one or more) may be provided and suitably aligned on the gauge mounting structure to measure compression, elongation, and twisting of the gauge mounting structure based upon similar forces acting upon and transferred from the effector. For example, a third sensor may be affixed in a suitable alignment along the gauge mounting structure surface to measure twisting or torque deflections of the effector with respect to the longitudinal dimension of the effector, which are in turn translated to the gauge mounting structure (via the strain transfer materials described above) for measurement by the sensors.

The sensors are connected to control circuitry 40 via individual wires 26 and 28, preferably disposed in a suitable sheath or conduit (not shown). The wires extend through longitudinal wall sections of the gauge mounting structure to connect with the sensors, and the wires further extend within the hollow interior of the gauge mounting structure and emerge from the opening at its second (free) end to connect with the control circuitry.

Control circuitry 40 is connected, via a suitable connector, to a standard peripheral connection port (e.g., serial, parallel, USB, etc.) of host computer system 20. The control circuitry processor receives measured strain information from sensors 22 and 24 and converts such measured information into readable data packets for the host computer system as described below. The data packets are preferably configured to be indistinguishable from the inputs of any standard peripheral (e.g., a conventional mouse, joystick, game pad, game controller, etc.). In other words, effector 2 is physically manipulated by the user to effect the transfer of the same type of inputs from the processor of control circuitry 40 to host computer system 20 that would normally be provided by a peripheral device to control operation of a software program running on the host computer system.

In operation, system 1 basically serves as a peripheral and sends the appropriate data to host computer system 20. In particular, the user holds effector 4 (e.g., near its free or unsupported end) of effector device 2 with his or her hands. An appropriate amount of force is applied by the user to effector 4 using his or her hands to effect a minimal degree of bending of the effector in a particular direction (e.g., about the predefined X axis as described above). At least a portion of the bending force or strain applied to effector 4 is transferred to gauge mounting structure 8, via the strain transfer materials (i.e., fitting 12, and epoxy resin plugs 14 and 16), to effect a corresponding degree of bending of the gauge mounting structure in the same or similar location and direction. The resultant transferred strain applied to gauge mounting structure 8 is measured by sensor 22.

The measured strain is received by the processor of control circuitry 40 (via wiring 26) as a digital data value, as described below, and is placed into data packets. The data packets include a format resembling the data output from a conventional computer peripheral that is manipulated in a manner corresponding to that of the effector. Similarly, the application of force by the user to the effector to effect bending of the effector bar, which in turn effects corresponding bending of the gauge mounting structure, in another particular direction (e.g., about the predefined Y axis as described above) results in strain measurements by sensor 24 and data packets being sent by the processor to the host computer system. The data packets include a format resembling data output from a conventional computer peripheral that is manipulated in a manner corresponding to that of the effector. Combined applications of force by the user on the effector and gauge mounting structure about both predefined axes similarly result in data packets being sent by the processor to the host computer system in a format resembling corresponding movements of a conventional computer peripheral.

The data packets provided by the processor of control circuitry 40 to host computer system 20 can be X and Y axis information typically provided by a computer peripheral for a computer game or other software providing images on a display screen 30 of the host computer system, where the axis information provided by the processor results in corresponding changes in the displayed images to reflect virtual movements within the virtual reality scenario. Thus, system 1 simulates the operability functions of a standard peripheral device, such as a joystick, while simultaneously achieving an isometric workout for various muscle groups of the user of the system. In addition, the system is operable with standard "off-the-shelf" gaming or other software programs that are designed for use with such standard peripheral devices.

Figure 2A:
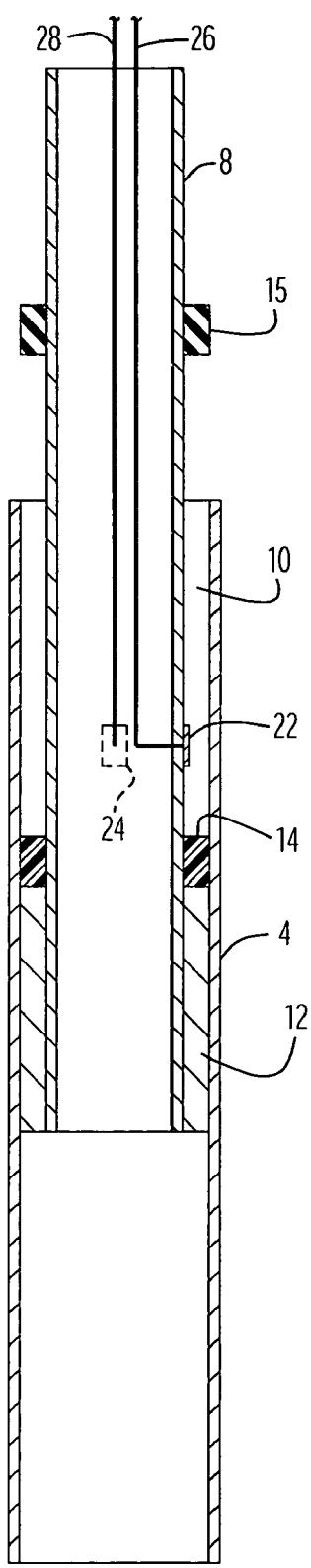
FIGS. 2A and 2B are side views in cross-section showing assembly of the effector device for the system of FIG. 1.
Figure 2B:
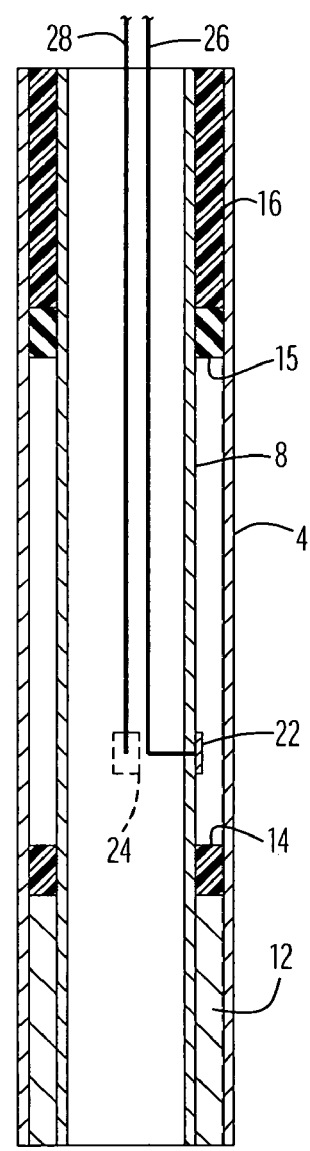

An exemplary method of assembling effector device 2 of isometric exercise system 1 is now described with reference to FIGS. 2A and 2B. Initially, a fitting 12 is secured to the first end of gauge mounting structure 8. In the preferred embodiment, in which the gauge mounting structure is constructed of PVC material, the fitting may also be constructed of PVC material and is secured to the first end of the mounting structure utilizing PVC glue and/or other suitable adhesives. Strain gauge sensors 22 and 24 are also initially secured at suitable locations to outer surface portions of gauge mounting structure 8. The strain gauges can be secured in any suitable manner to the mounting structure. For example, the strain gauge sensors can be secured to the mounting structure via an adhesive (e.g., a UV cured adhesive). Holes are formed through wall portions of the mounting structure (e.g., via drilling through the mounting structure) at the locations where strain gauge sensors are to be secured. Wires 22, 24 are inserted through the holes in the gauge mounting structure and secured to the strain gauge sensors. The wiring is further directed within the hollow interior of the mounting structure through the opening at the second end of the mounting structure for connecting with the control circuitry.

A collar 15 of foam rubber is secured around an outer peripheral portion of gauge mounting structure 8 at a selected location proximate the second end of the mounting structure. The collar can be secured in any suitable manner (e.g., frictional fit, secured via an adhesive, etc.) to the gauge mounting structure and is further suitably dimensioned to frictionally engage interior wall surface portions of effector 4 when the gauge mounting structure is inserted within the effector. The collar serves as a stopper for liquid epoxy resin that is applied within annular gap 10 near the second ends of the effector and gauge mounting structure as described below.

Upon securing the fitting, sensors with wiring and foam collar to the gauge mounting structure, the first end (including the fitting) of gauge mounting structure 8 is inserted within the second, open end of effector 4. Just prior to the insertion, a bead of liquid epoxy is applied to one or more interior surface portions of the effector. The epoxy serves as a lubricant between the interior surfaces of effector 4 and fitting 12 as the gauge mounting structure is inserted and moved axially within and toward the first end of the effector.

When the first end of the gauge mounting structure with fitting is inserted a suitable distance within the effector (e.g., when the fitting is situated about 20 mm from the second end of the effector), a suitable amount of liquid epoxy resin is injected into annular gap 10, via the open second end of the effector, where the epoxy resin is distributed generally uniform about the internal periphery of the effector. The effector is aligned such that its open second end is above its first end, which allows the liquid epoxy resin to flow downward within the annular gap to come into contact with fitting 12. The tight frictional fit between the fitting and the interior surface of the effector prevents the liquid epoxy resin from traveling beyond the fitting. The gauge mounting structure with fitting is then fully inserted within the effector such that the fitting and first end of the gauge mounting structure are generally aligned and substantially flush with the first end of the effector. After full insertion, the second end of the gauge mounting structure is also generally aligned and substantially flush with the second end of the effector.

Upon full or complete insertion of the gauge mounting structure within the effector, foam collar 15 is disposed within annular gap 10 a selected distanced from the second ends of gauge mounting structure 8 and effector 4. The foam collar is firmly secured to the gauge mounting structure and frictionally engages interior surface portions of the effector, thus providing a stopper or plug for liquid epoxy resin 16 that is injected within the annular gap between an upper surface of the collar and the second end of the effector. A sufficient amount of liquid epoxy resin is injected at the second end of the effector to substantially fill the annular gap portion between the upper surface of the collar and the second ends of the effector and gauge mounting structure. The plugs 14 and 16 of epoxy resin injected into the effector during assembly of the device are allowed to dry and cure. Upon curing, these plugs provide solid connecting or contact points between the gauge mounting structure and effector.

In assembling the effector device, the foam collar can be positioned at any suitable location from the second end of the gauge mounting structure to facilitate the formation of a plug of hardened epoxy resin that has a selected longitudinal dimension within the annular gap between the effector and gauge mounting structure. As depicted in FIGS. 1, 2A and 2B, foam collar 15 is secured at a suitable location on gauge mounting structure 8 such that epoxy plug 16 can be formed that has a longitudinal dimension of a similar length and extends axially within annular gap 10 a similar distance in comparison to fitting 12. Thus, the strain transfer surface areas (i.e., the surface contacting areas) of the respective inner and outer portions of the effector and gauge mounting structure at the first and second ends of the effector device are similar. However, depending upon a particular application, the effector device can be designed such that one or more strain transfer areas at one end of the device differ by any selected amount from one or more strain transfer areas at the other end of the device.

The effector design of the present invention provides a useful and less cumbersome configuration in that the strain gauges and associated wiring are effectively secured within and are thus not exposed on an exterior surface of the effector bar. This allows for easy use and manipulation of the effector bar. For example, in systems where the effector bar is designed for telescoping adjustability by axially displacing the effector bar within a hollow support structure, the outer surface of the effector bar can be maintained relatively smooth for easy transition to varying axial positions of the effector bar within the support structure. Further, the effector configuration renders assembly of the internal components relatively easy, since the strain gauge sensors and wiring can be secured to the gauge mounting structure prior to insertion and securing of the gauge mounting structure within the effector bar.

Figure 3A:
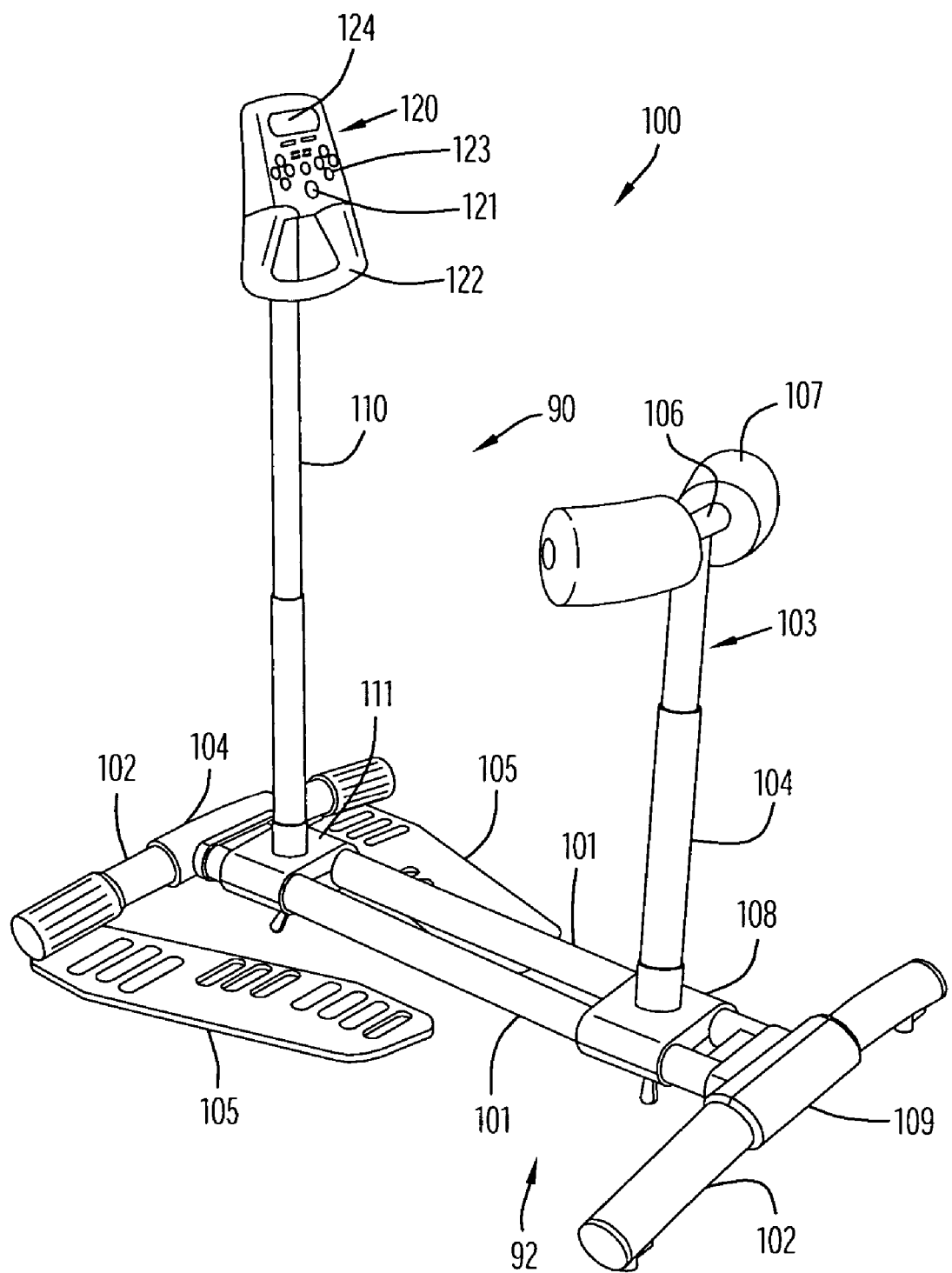
FIGS. 3A-3C are perspective views of isometric exercise systems serving as gaming controllers and utilizing an effector device according to the present invention.
Figure 3B:
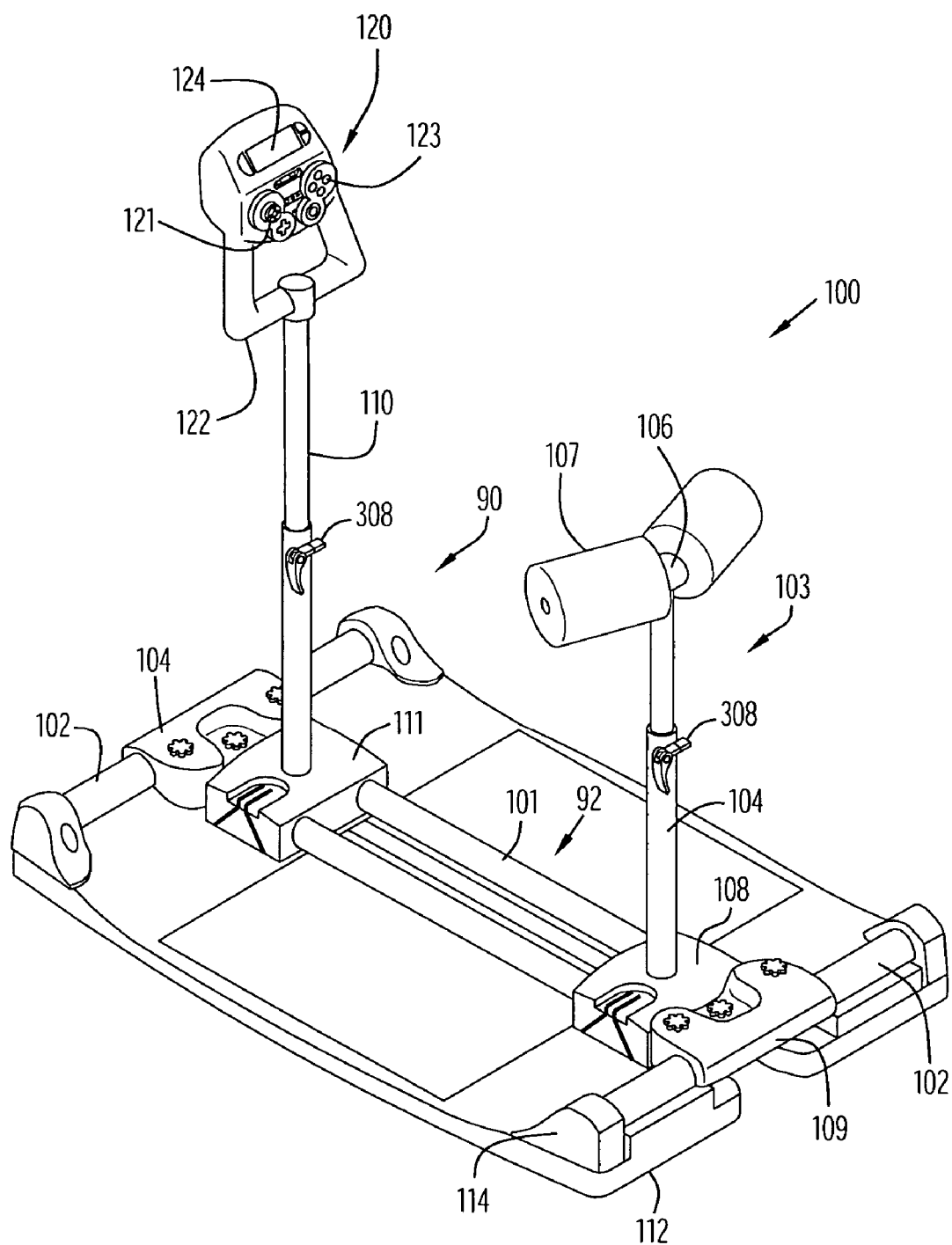
Figure 3C:
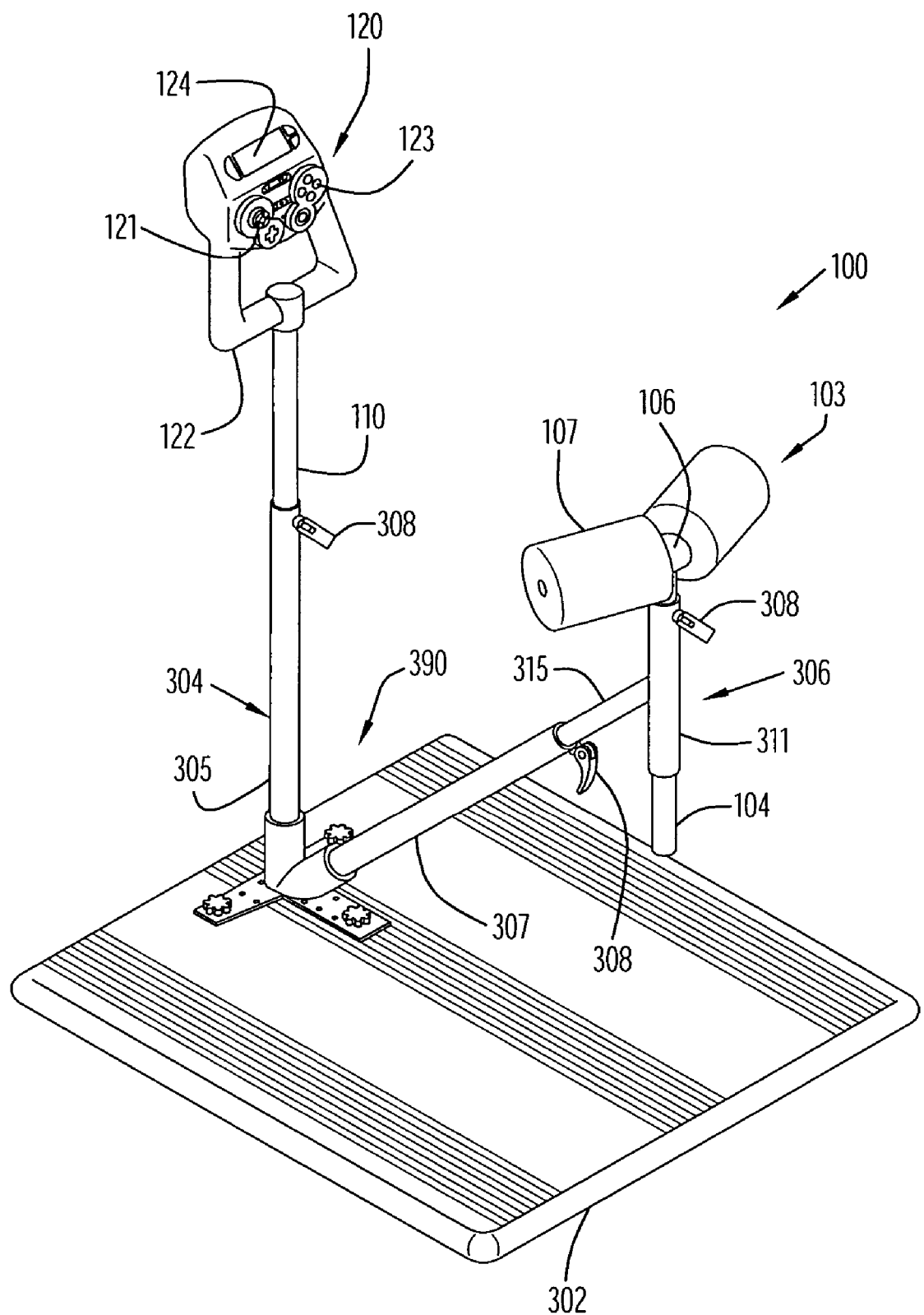

The effector device of the present invention may be utilized in various applications. In particular, the effector device may be employed within an exercise system used as a peripheral to a gaming system as illustrated in FIGS. 3A-3C. The exercise system may be of the type disclosed in any one of U.S. patent application Ser. No. 10/309,565 and U.S. patent application Ser. No. 10/975,185. The exercise system basically serves as a controller to provide user information to a game processor and enable the user to interact with the game in accordance with exercise performed by the user on the system as described below.

Referring to FIG. 3A, system 100 includes a frame 90 with a base 92 including elongated first base members 101 and elongated second base members 102. The second base members are each attached at a corresponding end of the first base members via brackets or clamps 109 to form an "I" configuration for the base. The first base members basically extend substantially in parallel between the second base members and are separated by a slight distance.

The second base members engage a support surface and include a slight curved configuration to suspend the first base members slightly above that surface. The second base member at the front of the system includes grips 105 disposed at each end and extending rearward therefrom to provide a gripping surface for user feet and to stabilize the system frame. A support 103 configured to support a user lower body portion (e.g., buttocks) is secured to a rear portion of the first base members via a bracket or clamp 108. Support 103 includes a substantially upright post 104 and a support member 106 attached to the top of the upright post to form a "T" type configuration. The support member includes a curved configuration to contour a user body portion and pads 107 extending inward from each support member end to enhance user comfort.

The frame further includes an effector bar 110 for manipulation by a user. The effector bar is substantially similar in design and configuration as effector 2 described above and depicted in FIG. 1. Effector bar 110 is further attached, via a bracket or clamp 111, to first base members 101 proximate front second base member 102. The effector bar is substantially upright and preferably modular and is constructed of a suitably rigid material (e.g., a metal alloy) that is capable of being slightly deflected within its elastic limit in response to any combination of bending, twisting, tension and compression forces applied by the user to the bar. While the effector bar is generally cylindrical, it is noted that the effector bar may be of any suitable shape (e.g., bent or curved, V-shaped, etc.) and have any suitable exterior surface geometries (e.g., curved, multifaceted, etc.). Additional effector bars may be secured to effector bar 110 to provide various configurations for exercise, while extender rods and/or lock mechanisms may be employed to adjust the effector bar and/or support in accordance with user characteristics (e.g., height, reach, etc.).

A controller 120 is attached or secured to the effector bar upper portion. The controller may be of the type available for conventional video games (e.g., PS2 available from Sony, XBOX from Microsoft, GAMECUBE available from Nintendo, etc.), such as the device described in U.S. Pat. No. 6,231,444. The controller preferably includes a series of buttons 123 and a joystick 121 disposed on the controller upper portion. The joystick and effector bar may be selectively configured or assigned to game functions as described below. Basically, effector bar 110 serves the function of a second controller joystick with respect to a game. The controller generally includes respective signal sources (e.g., variable resistor or potentiometers) to provide signals indicating joystick motion along X (e.g., left/right motions) and Y (e.g., forward/back motions) axes. However, the controller may include any quantity of any type of input devices (e.g., buttons, switches, a keypad, joystick, etc.) and signal sources disposed at any location and arranged in any fashion on the controller. The buttons and joystick may be utilized to enter any desired information (e.g., enter desired user actions for the game, etc.). Further, the controller may include input devices 156 (FIG. 4) to enter and reset resistance controls and reset clock or other functions, and input devices 157 to control function assignment of controller input devices as described below. Devices 156, 157 may be implemented by any conventional or other input devices (e.g., buttons, slides, switches, etc.). The controller lower portion includes a generally "U"-shaped handle or grip 122 for engagement by a user.

Effector bar 110 includes at least one sensor to measure at least one type of strain applied by the user to that bar. In particular, a gauge mounting structure, strain gauges and corresponding strain transfer materials are secured within the effector bar and are similar in design and configuration to gauge mounting structure 8, strain gauges 22 and 24, fitting 12 and epoxy resin plugs 14 and 16 as described above and depicted in FIG. 1. Thus, any bending, twisting, tension and/or compression forces applied to effector 110 are transferred to the gauge mounting structure secured within the effector for measurement by the strain gauge sensors mounted to the gauge mounting structure.

Preferably, effector bar 110 includes strain gauge sensors 150, 160 (FIG. 4) that are arranged along outer surface portions of the internally mounted gauge mounting structure in a similar manner as described above and depicted in FIG. 1. These sensors measure the amount of a strain deformation applied to the bar as a result of the user applying pushing, pulling or lateral forces to the controller handle. By way of example only, sensor 150 may measure force applied to the effector bar, and transferred to the gauge mounting structure, along an X-axis (e.g., lateral or left/right forces), while sensor 160 may measure forces applied to the effector bar, and transferred to the gauge mounting structure, along a Y-axis (e.g., push/pull or forward/backward forces). Additional effector bars may each include internally mounted gauge mounting structures including respective strain gauge sensors to measure the amounts of bending, twisting, tension and/or compression forces applied to those bars.

The sensors are connected to a control circuit 200 (FIG. 4) within controller 120 via appropriate wiring, where the controller provides appropriate information to a game processor for a video game application. Preferably, the wiring is secured to the strain gauge sensors and extends within a hollow interior of the gauge mounting structure in a similar manner as the sensor wires 26 and 28 described above and depicted in FIG. 1 for connecting with control circuit 200. Strain gauge measurements that are received and processed by the control circuit and provided to the game processor are further processed to display a video game scenario on a display. The scenario is updated in accordance with strain forces applied to the effector bar by a user. The controller may further be configured to control the level of exertion required by a user for one or more effectors in order to achieve a particular response in the video game scenario. Resistance levels may be input to an exercise processor 154 (FIG. 4) by the user via input devices 156 (e.g., a keypad). Alternatively, or in combination with user input, the resistance levels may be controlled by the exercise processor based upon conditions within the video game scenario, such as changing wind conditions, changing grade of the terrain (e.g., going uphill), etc.

A display 124 is further disposed on the controller upper portion and may display various information to the user (e.g., the degree of force applied to a particular effector bar at any given time, the amount of work performed by the user during a particular exercise session, resistance levels, time or elapsed time, force applied to the various axes (X and Y axes), instantaneous force applied and/or any other exercise or other related information). The display is preferably implemented by a Liquid Crystal Display (LCD), but may be any type of display (e.g., LED, etc.).

An alternative exercise system employing a configurable controller is illustrated in FIG. 3B. Exercise system 100 is substantially similar to the exercise system described above for FIG. 3A, with base 92 secured to a platform 112 to provide a gripping surface for user feet. The platform is substantially rectangular and includes a gripping surface (e.g., rubber or rubber type material, etc.) for user feet and receptacles 114 each disposed toward a corresponding platform corner. The receptacles each engage a corresponding end of a second base member 102 to secure the frame to the platform. Lock mechanisms 308 enable adjustment of effector bar and support height. Effector bar 110 is substantially similar in design and configuration to the effector bars described above and depicted in FIGS. 1 and 3A and includes a strain gauge mounting structure, strain gauges and strain transfer materials disposed within the effector bar to facilitate transfer of forces applied to the effector bar to the gauge mounting structure for measurement by the strain gauges. In addition, controller 120 is substantially similar to the controller described above and includes a slightly modified arrangement of input devices (e.g., joystick 121, buttons, 123, etc.). Controller handle 122 is mounted to the top surface of effector bar 110 to enable user interaction with a video game.

Yet another exercise system is illustrated in FIG. 3C. System 100 is similar to the exercise systems described above and includes a frame 390 mounted to a base platform 302. The base platform is substantially rectangular and includes a gripping surface (e.g., rubber or rubber type material, etc.) for user feet. Frame 390 includes a generally 'V'-shaped mounting member 304 secured or bolted to a front portion of base platform 302. The mounting member includes a substantially cylindrical effector receptacle 305 and a substantially cylindrical mounting receptacle 307 arranged to form the 'V'-shaped configuration.

Mounting receptacle 307 receives a generally 'Y'-shaped mounting member 306. Mounting member 306 includes a substantially cylindrical mounting post 315 and a substantially cylindrical support receptacle 311 arranged to form the 'Y'-shaped configuration. The mounting post includes dimensions less than those of mounting receptacle 307 for insertion within that receptacle, where the mounting post and receptacle form a telescoping arrangement.

Support 103 is substantially similar to the support described above and includes post 104 and support member 106 attached to the top of the post forming a 'T'-type configuration. The support member includes a curved configuration to contour a user body and pads 107 to enhance user comfort as described above. Post 104 includes dimensions less than those of the support receptacle for insertion within that receptacle, where the post and support receptacle form a telescoping arrangement. Lock mechanisms 308 maintain the positions of mounting post 315 and post 104 to enable adjustment of the support distance and height relative to the user, respectively.

Effector bar 110 is substantially similar in design and configuration to the effector bars described above and depicted in FIGS. 1 and 3B and includes a strain gauge mounting structure, strain gauges and strain transfer materials disposed within the effector bar to facilitate transfer of forces applied to the effector bar to the gauge mounting structure for measurement by the strain gauges. In addition, controller 120 is substantially similar to the controller described above for FIG. 3B and includes handle 122 mounted to the effector bar top surface to enable user interaction with a video game as described above. The effector bar includes dimensions less than those of the effector receptacle for insertion within that receptacle, where the effector bar and receptacle form a telescoping arrangement. Lock mechanism 308 maintains the effector bar position to enable adjustment of the controller height relative to the user.

In addition, the exercise systems described above may further include exercise devices (e.g., foot pedals, stairs, ski type exercisers, treadmills, cycling, etc.) that provide isokinetic and/or isotonic exercise features in addition to the isometric exercise features provided by the effector bar. These exercise devices are associated with signal sources including sensors (e.g., resistors, strain gauges, potentiometers, etc.) that measure user activity and provide a signal indicating the measurement. The exercise devices may be utilized to provide user information to the video game processor and enable the user to interact with the game in accordance with exercise performed by the user on the devices as described below.

Figure 4:
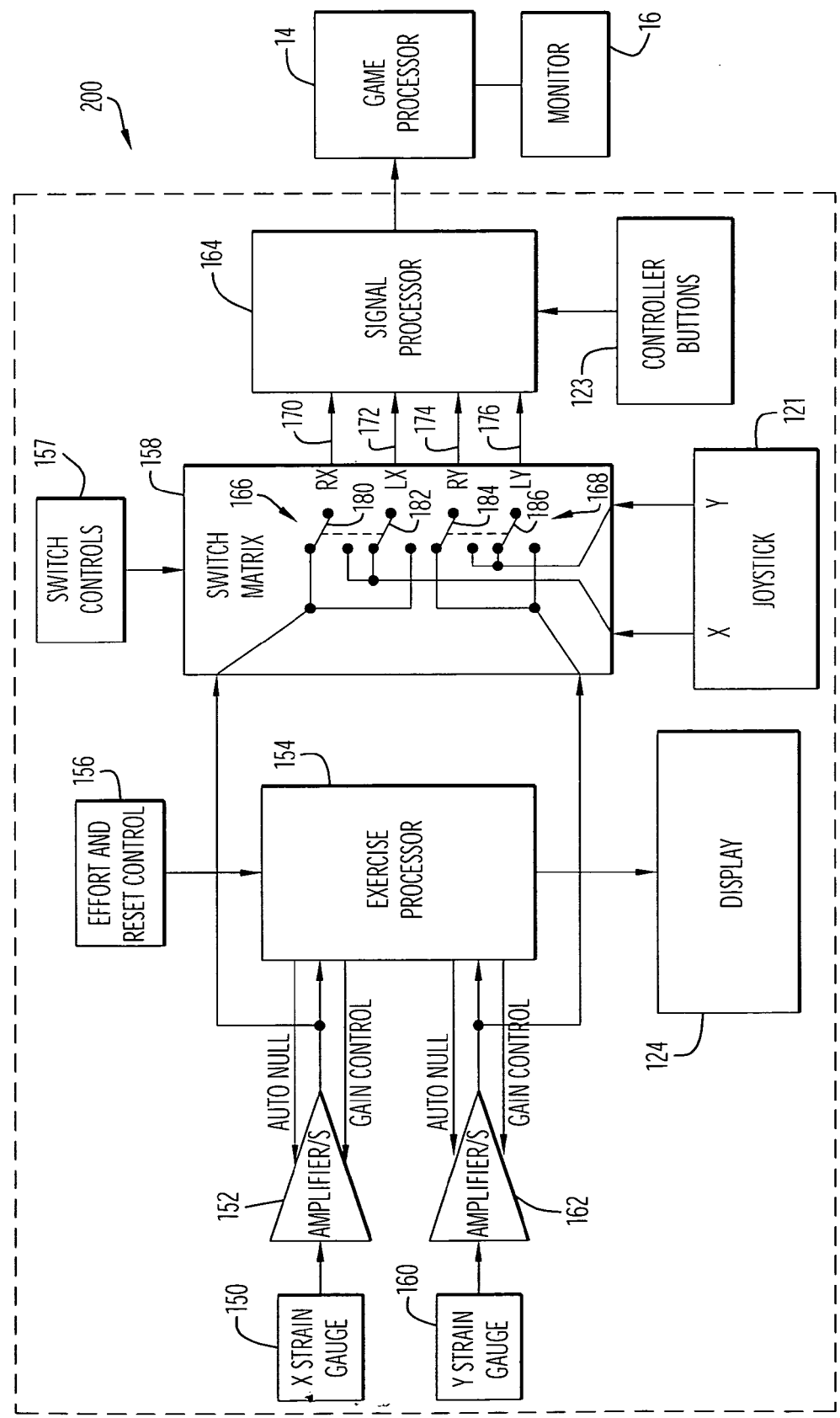
FIG. 4 is a schematic block diagram of an exemplary control circuit for the isometric exercise systems of FIGS. 3A-3C.

An exemplary control circuit for the systems described above and depicted in FIGS. 3A-3C is illustrated in FIG. 4. Specifically, control circuitry 200 includes sensors 150, 160 and corresponding amplifiers 152, 162, exercise processor 154, a switching device or matrix 158 and a signal processor 164. A conventional power supply (not shown) provides appropriate power signals to each of the circuit components. The circuit may be powered by a battery and/or any other suitable power source. A power switch (not shown) may further be included to activate the circuit components.

Sensors 150, 160 are each connected to a respective amplifier 152, 162. The electrical resistance of sensors 150, 160 vary in response to compression and stretching of the effector bar and gauge mounting structure. Amplifiers 152, 162 basically amplify the sensor signals (e.g., in a range compatible with the type of controller employed). The amplified voltage value is sent by each amplifier to exercise processor 154 and switching device 158. Exercise processor 154 may be implemented by any conventional or other processor and typically includes circuitry and/or converts the analog signals from the amplifiers to digital values for processing. Basically, the amplified sensor value represents the force applied by the user, where values toward the range maximum indicate greater applied force. The amplified analog value is digitized or quantized within a range in accordance with the quantity of bits within the converted digital value (e.g., −127 to +127 for eight bits signed, −32,767 to +32,767 for sixteen bits signed, etc.) to indicate the magnitude and/or direction of the applied force. Thus, amplified voltage values toward the range maximum produce digital values toward the maximum values of the quantization ranges.

The exercise processor receives resistance level and reset controls from the user via input devices 156 as described above, and controls amplifier gain parameters to adjust system resistance in accordance with the user specified controls. In particular, the exercise processor adjusts the gain control of the amplifiers in order to facilitate a resistance level in accordance with user input and/or the video game scenario. The gain control parameter basically controls the amount of gain applied by the amplifier to an amplifier input (or sensor measurement). Since greater amplified values correspond to a greater force, increasing the amplifier gain enables a user to exert less force to achieve a particular amplified force value, thereby effectively lowering the resistance of the system for the user. Conversely, reducing the amplifier gain requires a user to exert greater force to achieve the particular amplified force value, thereby increasing the resistance of the system for the user. The exercise processor further adjusts an amplifier Auto Null parameter to zero or tare the strain gauge sensors.

The exercise processor is further connected to display 124 to facilitate display of certain exercise or other related information as described above. The exercise processor receives the amplified sensor values and determines various information for display to a user (e.g., the degree of force applied to a particular effector bar at any given time, the amount of work performed by the user during a particular exercise session, resistance levels, time or elapsed time, force applied to the various axes (X and Y axes), instantaneous force applied and/or any other exercise or other related information). In addition, the exercise processor resets various parameters (e.g., resistance, time, work, etc.) in accordance with reset controls received from input devices 156.

Switching device 158 receives the signals from amplifiers 152, 162 and is coupled to input devices or switch controls 157, joystick 121 and signal processor 164. Switching device 158 enables a user to selectively configure controller 120 for game functions as described below. By way of example only, effector bar 110 (FIGS. 3A-3C) serves as a right controller joystick, while joystick 121 serves as the left controller joystick, where the functions of the joysticks with respect to a game may be selectively assigned by a user as described below. However, the effector bar may serve as any joystick or other input device.

The switching device receives information from amplifiers 152, 162 and is coupled to the inputs of signal processor 164. The switching device basically enables information for controller input devices to be selectively placed on the signal processor inputs corresponding to the desired game functions. In particular, switching device 158 is utilized to selectively exchange game functions between joystick 121 and the effector bar. The switching device includes double pole double throw switches 166, 168 that are respectively associated with X and Y motion axes. By way of example only, switch 166 is associated with an X motion axis (e.g., lateral or right/left forces applied to the effector bar or joystick), while switch 168 is associated with the Y motion axis (e.g., forward/backward forces applied to the effector bar or joystick).

A series of switching device outputs 170, 172 and 174, 176 (e.g., labeled RX, LX, RY and LY, respectively, as viewed in FIG. 4) are respectively associated with switches 166, 168 and are each coupled to specific inputs of signal processor 164. The signal processor inputs are typically mapped to game functions in accordance with the game software executed by a game processor. Switches 166, 168 basically couple the signals from the desired devices (e.g., effector bar or joystick) to the signal processor inputs corresponding to the desired game functions in accordance with controls from a user entered via input devices or switch controls 157. In particular, switch 166 includes for each corresponding throw switch 180, 182 switch contacts that are coupled to sensor 150 and to the signal source of joystick 121 measuring X axis motion. Throw switch 180 is associated with output 170, while throw switch 182 is associated with output 172. These outputs effectively represent the X axis (e.g., lateral or left/right) motion of controller joysticks. The throw switches are configured in a manner to enable the signal from sensor 150 to be placed on one output and the joystick signal to be placed on the other output in accordance with the user control signals, thereby enabling the user to map the joystick or effector bar to a desired game function.

Similarly, switch 168 includes for each corresponding throw switch 184, 186 switch contacts that are coupled to sensor 160 and to the signal source of joystick 121 measuring Y axis motion. Throw switch 184 is associated with output 174, while throw switch 186 is associated with output 176. These outputs effectively represent the Y axis (e.g., forward/backward) motion of controller joysticks. The throw switches are configured in a manner to enable the signal from sensor 160 to be placed on one output and the joystick signal to be placed on the other output in accordance with the user control signals, thereby enabling the user to map the joystick or effector bar to a desired game function. Thus, the functions of joysticks within a game may be selectively assigned to be performed by joystick 121 and/or the effector bar.

Applications of higher complexity with respect to blending functions may require additional selector switches and various combinations of selector switch settings. For example, the joystick or effector bar may individually perform the functions of two joysticks in accordance with the connections. Further, the exercise systems may include various devices (e.g., foot pedals, stairs, ski type exercisers, treadmills, cycling, etc.) that provide isokinetic and/or isotonic exercise features in addition to the isometric exercise features provided by the effector bar as described above. These exercise devices may similarly be assigned to game functions by the user in substantially the same manner described above. In this case, the signal sources associated with these devices are coupled to switching device 158 to direct the signals associated with the exercise devices to the appropriate inputs of signal processor 164. Switching device 158 may include any desired configuration as described above to accomplish the function assignments for these exercise devices.

The signals from the switching device outputs are transmitted to a respective predetermined memory location within signal processor 164. The signal processor may be implemented by any conventional or other processor and typically includes circuitry and/or converts the analog signals from the switching device to digital values for processing in substantially the same manner described above. The signal processor samples the memory locations at predetermined time intervals (e.g., preferably on the order of ten milliseconds or less) to continuously process and send information to the game processor to update and/or respond to an executing gaming application.

Basically, the signal processor processes and arranges the switching device signals into suitable data packets for transmission to the game processor. The signal processor may process raw digital values in any fashion to account for various calibrations or to properly adjust the values within quantization ranges. The data packets are in a format resembling data input from a standard peripheral device (e.g., game controller, etc.). For example, the processor may construct a data packet that includes the status of all controller input devices (e.g., joystick 121, buttons 123, etc.) and the values of each sensor. By way of example only, the data packet may include header information, X-axis information indicating a corresponding sensor force and joystick measurement along this axis, Y-axis information indicating a corresponding sensor force and joystick measurement along this axis, rudder or steering information, throttle or rate information and additional information relating to the status of input devices (e.g., buttons, etc.). Additional packet locations may be associated with data received from controller or other input and/or exercise devices coupled to the signal processor, where the input devices may represent additional operational criteria for the scenario (e.g., the firing of a weapon in the scenario when the user presses an input button, throttle, etc.). The game processor processes the information or data packets in substantially the same manner as that for information received from a conventional peripheral (e.g., game controller, etc.) to update and/or respond to an executing gaming application (e.g., game, etc.).

Operation of exercise systems 100 is described with reference to FIGS. 3A-3C and 4. Initially, the user couples the system to game processor 14 and selectively assigns game functions to the joystick, effector bar and/or other input and/or exercise devices as described above. The user may adjust the exercise system (e.g., controller height, support height and distance, etc.) to accommodate the user physical characteristics. A game is selected and executed on the game processor and the user engages in an exercise to interact with the game. The user operates the system with the user lower body portion (e.g., buttocks) supported by support 103, the user feet engaging grips 105 (FIG. 3A), platform 112 (FIG. 3B) or base platform 302 (FIG. 3C), and the user hands placed on controller handle 122. The user grips the controller handle and applies a force to the controller to exert a strain on the effector bar which is in turn transferred to the gauge mounting structure secured within the effector bar. The user applies one or more forces to the controller and, hence, the effector bar and gauge mounting structure with respect to at least one of the X and Y axes so as to effect corresponding movement, for example, of a character or an object in the scenario displayed by the game processor. The user may further manipulate joystick 121, other controller input devices and/or other exercise devices for additional actions depending upon the particular game and user function assignments.

The signals from the strain gauge sensors and input and/or exercise devices (e.g., joystick, buttons, stair climbing, cycling, pedals, etc.) are transmitted to signal processor 164 via switching device 158 as described above. The signal processor generates the data packets for transference to game processor 14. The game processor processes the information or data packets in substantially the same manner as that for information received from a conventional peripheral (e.g., game controller, etc.) to update and/or respond to an executing gaming application. Thus, the force applied by the user to the effector bar results in a corresponding coordinate movement or action in the scenario displayed on a display 16 in accordance with the function assigned to the bar by the user. In other words, user exercise serves to indicate desired user actions or movements to the game processor to update movement or actions of characters or objects within the game in accordance with the function assigned to the bar or other exercise device by the user. For example, when the user assigns the effector bar accelerator and steering functions, application of a forward force to the controller may serve as the accelerator, while lateral force applied to the controller may serve as the steering function.

It will be appreciated that the embodiments described above and illustrated in the drawings represent only a few of the many ways of implementing a force measurement system for an isometric exercise device.

The effector device may include any suitable number of effectors and gauge mounting structures secured within the effectors. The effectors and gauge mounting structures may be constructed of any suitable materials that preferably permit their deformation within an elastic limit as a result of bending, twisting, compression and/or torque forces applied to the effector. Preferably, the gauge mounting structures are constructed of materials that are more compliant and have greater flexibility than the effectors to which they are secured when each are subjected to the same amount and/or type of forces.

The effectors and gauge mounting structures may have any suitable geometric configurations that preferably facilitate securing of one or more gauge mounting structures within an effector, and two or more effectors may be combined in any suitable manner to yield a system frame that conforms to a desired design for a user for a particular application.

The gauge mounting structures may be hollow (as in the embodiments described above and depicted in FIGS. 1, 2A and 2B) or solid. For example, in an embodiment where a gauge mounting structure is hollow, the strain gauge sensors may be secured at suitable locations to outer surface portions on the gauge mounting structure with associated wiring extending within the annular gap between the gauge mounting structure and the effector bar. Alternatively, the gauge mounting structures may be solid structures, where both the strain gauges and wiring are secured and/or extend from outer surface portions of the gauge mounting structures.

Strain transfer materials may be provided of any suitable types, sizes and configurations to facilitate transfer of applied forces from the effectors to one or more gauge mounting structures disposed within the effector bars. The strain transfer materials can be formed of any suitable materials that effect a transfer of at least a portion of the applied forces from the effector to the gauge mounting structure. The strain transfer materials may be disposed at any one or more suitable locations within the effectors to provide a connection at selected surface locations between the effectors and the gauge mounting structures. Alternatively, gauge mounting structures may be designed to include one or more suitably sized and configured outer peripheral sections that frictionally engage with interior peripheral surface portions of the effector bars so as to facilitate one or more strain transfer contacting surfaces between the gauge mounting structures and the effector bars.

Any suitable number of any types of sensors may be disposed at any locations on the gauge mounting structures and/or other suitable locations, and the sensors may be utilized to measure any type of strain or other force applied to any suitable number of effectors or to measure any types of user exercise. The sensors may be constructed of any suitable materials, may be disposed at any system locations and may be of any suitable type (e.g., strain gauge, potentiometer, etc.). Further, the sensors may include any electrical, mechanical or chemical properties that vary in a measurable manner in response to applied force or other motion to measure exercise performed by the user. The handle of the exercise system controller may be of any shape or size and disposed at any location to receive force applied by a user. Alternatively, the user may apply force directly to the effector bar. The effector bars and/or exercise devices may be assigned the gaming functions of any desired controller input devices.

The controllers may be of any shape or size, may be constructed of any suitable materials, and may be of the type of any commercially available or other game controller (e.g., those for use with PS2, XBOX, GAMECUBE, etc.). The controllers may include any quantity of any types of input devices (e.g., buttons, slides, joysticks, track type balls, etc.) disposed at any locations and arranged in any fashion. The controllers may include any quantity of any types of signal source devices to generate signals in accordance with input device manipulation (e.g., variable resistors or potentiometers, switches, contacts, relays, sensors, etc.). The signal sources may correspond with any quantity of motion axes for an input device. Any controller input devices may be assigned to any suitable game functions by the switching device.

The switching matrix or devices may be implemented by any quantity of any conventional or other devices capable of switching signals (e.g., switches, multiplexers, cross-bar switch, analog switches, digital switches, routers, logic, gate arrays, logic arrays, etc.). The switching controls or switch control unit may be implemented by any conventional or other control or input devices (e.g., processor, slides, switches, buttons, etc.). The control processor may be implemented by any conventional or other processor or circuitry (e.g., microprocessor, controller, etc.). The switching devices may direct signals from any quantity of inputs to any quantity of outputs in accordance with user-specified or other controls and may map any controller input devices and/or exercise devices to any suitable game functions. The switching device may be disposed internal or external of the controllers.

The game processor may be implemented by any quantity of any personal or other type of computer or processing system (e.g., IBM-compatible, Apple, Macintosh, laptop, palm pilot, microprocessor, gaming consoles such as the Xbox system from Microsoft Corporation, the Play Station 2 system from Sony Corporation, the GameCube system from Nintendo of America, Inc., etc.). The game processor may be a dedicated processor or a general purpose computer system (e.g., personal computer, etc.) with any commercially available operating system (e.g., Windows, Unix, Linux, etc.) and/or commercially available and/or custom software (e.g., communications software, application software, etc.) and any types of input devices (e.g., keyboard, mouse, microphone, etc.). The game processor may execute software from a recorded medium (e.g., hard disk, memory device, CD, DVD or other disks, etc.) or from a network or other connection (e.g., from the Internet or other network).

The exercise systems and components (e.g., frames, effectors, extenders, connectors, bases, base members, supports, grips, platforms, mounting members, posts, receptacles, pads, etc.) may be of any size or shape, may be arranged in any fashion and may be constructed of any suitable materials. Each of the exercise systems may be adjustable in any fashion (e.g., any dimension, controller and/or support height, controller and/or support orientation or distance to the user, etc.) via any types of arrangements of components (e.g., telescoping arrangement, overlapping arrangement, extender components, etc.) to accommodate user physical characteristics. The locking mechanisms may include any type of locking device (e.g., friction device, clamp, peg and hole arrangement, etc.) to releasably maintain an exercise system component in a desired position or orientation to accommodate a user.

Any suitable connector may be utilized to connect any two or more effectors together, including, without limitation, lug nuts, couplings, tee fittings, wye fittings and cross fittings. Any number of connectors may be utilized to form a system frame of effectors. The connectors may be constructed of any suitable materials. The frame may include any quantity of any type of seat or other user support structure disposed at any locations to support a user or user body portions.

The processors (e.g., control, exercise, signal, game, switching devices, etc.) may be implemented by any quantity of any type of microprocessor, processing system or other circuitry, while the control circuitry may be disposed at any suitable locations on the systems, within the controller or, alternatively, remote from the systems. The control circuitry and/or signal processor may be connected to one or more game processors or host computer systems via any suitable peripheral, communications media or other port of those systems. The signal processors may further arrange digital data (e.g., force or other measurements by sensors, controller information, etc.) into any suitable data packet format that is recognizable by the game processor or host computer system receiving data packets from the signal processors. The data packets may be of any desired length, include any desired information and be arranged in any desired format.

The signal processor may sample the information at any desired sampling rate (e.g., seconds, milliseconds, microseconds, etc.), or receive measurement values or other information in response to interrupts. The analog values may be converted to a digital value having any desired quantity of bits or resolution. The processors (e.g., control, signal, exercise, etc.) may process raw digital values in any desired fashion to produce information for transference to the display, game processor or host computer system. This information is typically dependent upon a particular application. The correlation between the measured force or exercise motion and provided value for that force or motion may be determined in any desired fashion. By way of example, the amplified measurement range may be divided into units corresponding to the resolution of the digital value. For an eight bit unsigned digital value (e.g., where the value indicates the magnitude of force), each increment represents 1/256 of the voltage range. With respect to a five volt range, each increment is 5/256 of a volt, which is approximately 0.02 volts. Thus, for an amplified force measurement of three volts, the digital value may correspond to approximately 150 (i.e., 3.0/0.2).

Any suitable number of any types of conventional or other circuitry may be utilized to implement the control circuit, amplifiers, sensors, switching device and processors (e.g., exercise, control, signal, etc.). The amplifiers may produce an amplified value in any desired voltage range, while the A/D conversion may produce a digitized value having any desired resolution or quantity of bits (e.g., signed or unsigned). The control circuit may include any quantity of the above or other components arranged in any fashion. The resistance change of the sensors may be determined in any manner via any suitable conventional or other circuitry. The amplifiers and processors (e.g., exercise, signal, etc.) may be separate within a circuit or integrated as a single unit. Any suitable number of any type of conventional or other displays may be connected to the processors (e.g., exercise, signal, control, game, etc.) to provide any type of information relating to a particular computer interactive exercise session (e.g., results from isometric exercises including force and work, results from motion exercise including speed and distance traveled, calories burned, etc.). A display may be located at any suitable location on or remote from the exercise systems.

Any suitable number of additional input devices may be provided for the system to enhance video game scenarios. The input devices may be provided on any suitable number of control panels that are accessible by the user during system operation and have any suitable configuration (e.g., buttons, switches, keypads, etc.). The exercise devices (e.g., foot pedals, stairs, ski type exercisers, treadmills, etc.) may provide any isokinetic and/or isotonic exercise features in addition to or instead of the isometric exercise features provided by effectors. The exercise devices may be assigned to any desired game functions in the manner described above and may further be resistance controlled by the exercise processor, where control signals may be transmitted to a resistance or braking device or the amount of effort required by the user may be modified.

The resistance level for the effector bar and other exercise devices may be controlled by adjusting amplifier or other parameters. Alternatively, the resistance level may be controlled based on thresholds entered by a user. For example, the processors (e.g., exercise and/or signal processors) may be configured to require a threshold resistance level be achieved, which is proportionate to the amount of straining force applied by the user to one or more effectors or to an amount of motion or force applied to an exercise device (e.g., rate of stair climbing or pedaling, etc.) before assigning appropriate data values to the data packets to be sent to the game processor or host computer. Threshold values for the change in resistance may be input to the processor by the user via an appropriate input device (e.g., a keypad).

It is to be understood that the software of the exercise systems and/or processors (e.g., control, exercise, game, signal, switching devices, etc.) may be implemented in any desired computer language, and could be developed by one of ordinary skill in the computer and/or programming arts based on the functional description contained herein. Further, any references herein of software performing various functions generally refer to computer systems or processors performing those functions under software control. The processors (e.g., control, exercise, signal, switching device, etc.) may alternatively be implemented by hardware or other processing circuitry, or may be implemented on the game processor or host system as software and/or hardware modules receiving the sensor and/or input device information or signals. The various functions of the processors (e.g., control, exercise, signal, game, switching devices, etc.) may be distributed in any manner among any quantity (e.g., one or more) of hardware and/or software modules or units, processors, computer or processing systems or circuitry, where the processors, computer or processing systems or circuitry may be disposed locally or remotely of each other and communicate via any suitable communications medium (e.g., LAN, WAN, Intranet, Internet, hardwire, modem connection, wireless, etc.). The software and/or algorithms described above may be modified in any manner that accomplishes the functions described herein.

The terms "upward", "downward", "top", "bottom", "side", "front", "rear", "upper", "lower", "vertical", "horizontal", "height", "width", "length", "forward, "backward", "left", "right" and the like are used herein merely to describe points of reference and do not limit the present invention to any specific orientation or configuration.

The force measurement system of the present invention is not limited to the gaming applications described above, but may be utilized as a configurable peripheral for any processing system, software or application.

Having described preferred embodiments of a force measurement system for an isometric exercise device, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A force measurement system comprising:
an effector device including a hollow interior;
an inner support disposed within said hollow interior of said effector device; and
at least one sensor secured at a selected location to said inner support and configured to measure a force applied to said inner support;
wherein at least one outer surface portion of said inner support is coupled with at least one interior surface portion of said effector device such that forces applied to said effector device are at least partially transferred to said inner support for measurement by said at least one sensor.

2. The system of claim 1, further comprising:
at least one strain transfer material secured between said at least one outer surface portion of said inner support and said at least one interior surface portion of said effector device such that forces are at least partially transferred from said effector device to said inner support via said at least one strain transfer material.

3. The system of claim 1, wherein said inner support has a greater flexibility than said effector device such that a deformation for said inner support is greater than a deformation of said effector device when the same force is applied to each of said inner support and said effector device.

4. The system of claim 1, wherein said effector device is constructed of a metal material and said inner support is constructed of a plastic material.

5. The system of claim 2, wherein said at least one strain transfer material comprises an epoxy resin material.

6. The system of claim 2, wherein an annular gap is defined between an inner longitudinal periphery of said effector device and an outer longitudinal periphery of said inner support, and said at least one strain transfer material includes a first strain transfer material secured within said annular gap at a first end of said inner support and a second strain transfer material secured within said annular gap at a second end of said inner support.

7. The system of claim 2, wherein said inner support includes a hollow interior, and said at least one sensor is disposed at a selected location on said outer surface of said inner support.

8. The system of claim 7, further comprising at least one wire secured to said at least one sensor and extending within said hollow interior of said inner support to connect with an external device.

9. The system of claim 1, further comprising a processor including a data processing module to receive and process data corresponding to applied force information measured by said at least one sensor for transference to a host computer, wherein said data processing module produces information in a format resembling data output from a host computer peripheral to facilitate user interaction with said host computer in response to forces applied to said effector device by a user.

10. A method of measuring forces with a system including an effector device, an inner support disposed within a hollow interior of said effector device, at least one sensor coupled at a selected location on said inner support, and a processor coupled with said at least one sensor, the method comprising:
  (a) transferring at least a portion of force applied to said effector device to said inner support, via at least one outer surface portion of said inner support that is coupled with at least one interior surface portion of said effector device, for measurement by said at least one sensor; and
  (b) transferring applied force information from said at least one sensor to said processor.

11. The method of claim 10, wherein at least one strain transfer material is secured between said at least one outer surface portion of said inner support and said at least one interior surface portion of said effector device such that forces are at least partially transferred from said effector device to said inner support via said at least one strain transfer material.

12. The method of claim 10, wherein said inner support has a greater flexibility than said effector device such that a deformation for said inner support is greater than a deformation of said effector device when the same force is applied to each of said inner support and said effector device.

13. The method of claim 10, wherein said effector device is constructed of a metal material and said inner support is constructed of a plastic material.

14. The method of claim 11, wherein said at least one strain transfer material comprises an epoxy resin.

15. The method of claim 11, wherein an annular gap is defined between an inner longitudinal periphery of said effector device and an outer longitudinal periphery of said inner support, and said at least one strain transfer material includes a first strain transfer material secured within said annular gap at a first end of said inner support and a second strain transfer material secured within said annular gap at a second end of said inner support, and step (a) includes:
  (a.1) transferring at least a portion of said applied force of said effector device to said inner support at said first end of said inner support via said first strain transfer material and at said second end of said inner support via said second strain transfer material.

16. The method of claim 10, wherein said inner support includes a hollow interior, and said at least one sensor is disposed at a selected location on said outer surface of said inner support.

17. The method of claim 16, wherein at least one wire is secured to said at least one sensor and extends within said hollow interior of said inner support to connect with said processor, and step (b) includes:
  (b.1) transferring measured force information from said at least one sensor to said processor via said at least one wire.

18. The method of claim 10, wherein said processor includes a data processing module, and the method further comprises:
  (c) via said data processing module, processing data corresponding to applied force information measured by said at least one sensor; and
  (d) transferring said processed data to a host computer coupled with said processor in a format resembling data output from a host computer peripheral so as to facilitate user interaction with said host computer in response to forces applied to said effector device.

19. A support structure configured for at least partial insertion within a hollow interior of an effector device, said support structure including at least one sensor secured at a selected location to the support structure and configured to measure a force applied to said support structure;
  wherein at least one outer surface portion of said support structure is further configured to couple with at least one interior surface portion of said effector device, upon insertion of said support structure within the hollow interior of said effector device, such that forces applied to said effector device are at least partially transferred to said support structure for measurement by said at least one sensor.

20. The support structure of claim 19, wherein the at least one snesor is secured at a selected location to an outer surface portion of said support structure, and said support structure further includes a hollow interior and at least one wire secured to said at least one sensor and extending within the hollow interior of said support structure.

21. The support structure of claim 19, further including at least one strain transfer material secured between said at least one outer surface portion of said support structure and said at least one interior surface portion of said effector device such that, upon insertion of said support structure within the hollow interior of said effector device, forces are at least partaially transferred from said effector device to said support structure via said at least one strain transfer material.

22. the support structure of claim 21, wherein said at least one strain transfer material includes a fitting secured at a selected location around an outer peripheral surface portion of said support structure, wherein said fitting is configured to frictionally engage with hollow interior surfaces of said effector device upon insertion of said support structure within said effector device.

23. The support structure of claim 21, wherein said at least one strain transfer material includes an epoxy resin material.

24. The support structure of claim 21, further including a collar comprising a flexible material and being secured at a selected location around an outer peripheral surface portion of said support structure, wherein said collar is configured to frictionally engage with hollow interior surfaces of said effector device upon insertion of said support structure within said effector device.

* * * * *

(12) INTER PARTES REEXAMINATION CERTIFICATE (0280th)
United States Patent
Feldman et al.

(10) Number: US 7,331,226 C1
(45) Certificate Issued: Jul. 12, 2011

(54) FORCE MEASUREMENT SYSTEM FOR AN ISOMETRIC EXERCISE DEVICE

(75) Inventors: Philip Feldman, Catonsville, MD (US); Peter Tsai, Olney, MD (US); Greg Merril, Bethesda, MD (US); Jason Grimm, Owings Mills, MD (US); Jeff Schott, Bethesda, MD (US)

(73) Assignee: IA Labs, CA. LLC, Potomac, MA (US)

Reexamination Request:
No. 95/001,459, Oct. 1, 2010

Reexamination Certificate for:
| | |
|---|---|
| Patent No.: | 7,331,226 |
| Issued: | Feb. 19, 2008 |
| Appl. No.: | 11/133,449 |
| Filed: | May 20, 2005 |

(51) Int. Cl.
*G01L 7/00* (2006.01)

(52) U.S. Cl. .................. 73/379.01; 73/862.043
(58) Field of Classification Search ........ 73/379
See application file for complete search history.

(56) References Cited

U.S. PATENT DOCUMENTS

| | | | |
|---|---|---|---|
| 4,688,444 | A | 8/1987 | Nordstrom |
| 6,259,382 | B1 | 7/2001 | Rosenberg |
| 6,331,849 | B1 | 12/2001 | VandenBoom |
| 6,638,175 | B2 | 10/2003 | Lee |
| 2003/0107502 | A1 | 6/2003 | Alexander |

FOREIGN PATENT DOCUMENTS

| | | |
|---|---|---|
| JP | 44-23551 | 10/1969 |
| JP | 55-95758 | 7/1980 |
| JP | 55-125369 | 9/1980 |
| JP | 07-213745 | 8/1995 |

*Primary Examiner* — Mark Sager

(57) ABSTRACT

A force measurement system includes an effector device with a hollow interior, an inner support secured within the hollow interior of the effector device, and at least one sensor secured at a selected location to the inner support and configured to measure a force applied to the inner support. At least one outer surface portion of the inner support is coupled with at least one interior surface portion of the effector device such that forces applied to the effector device are at least partially transferred to the inner support for measurement by the sensor.

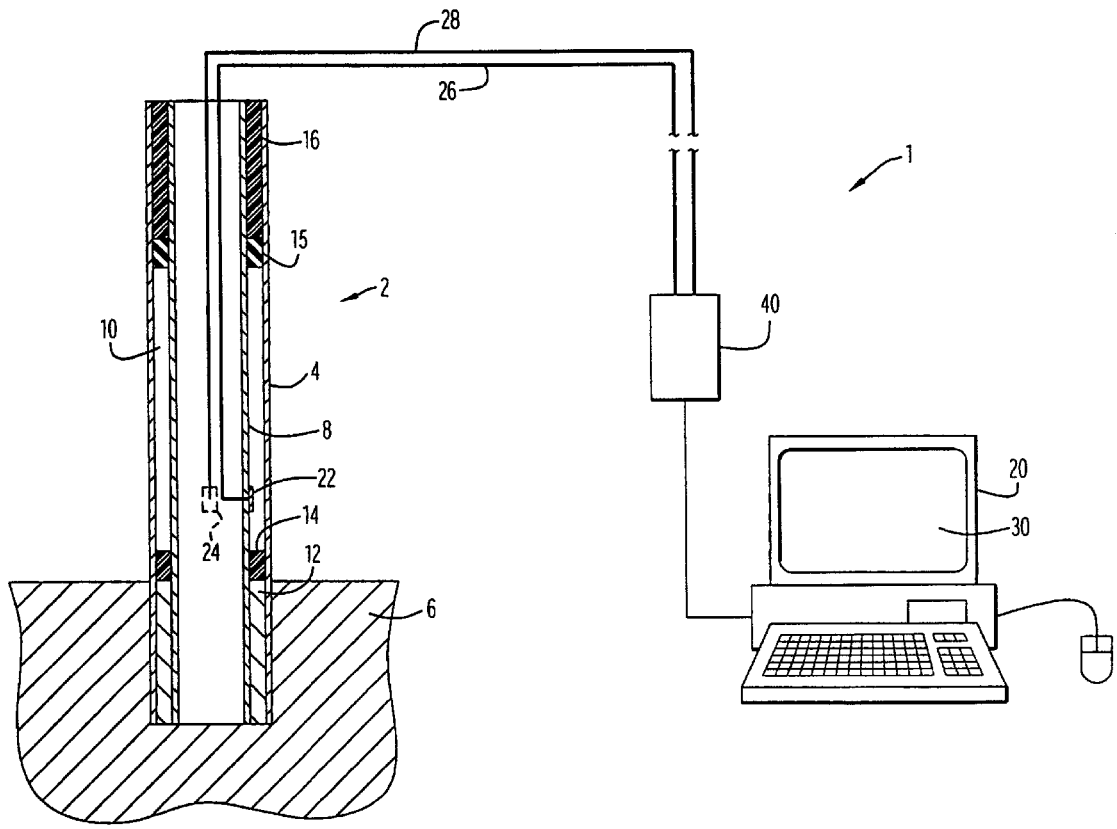

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-24 are cancelled.

* * * * *